Nov. 25, 1924.
J. ANDERSON
CLEVIS FOR SINGLETREES
Filed Jan. 8, 1923
1,516,876
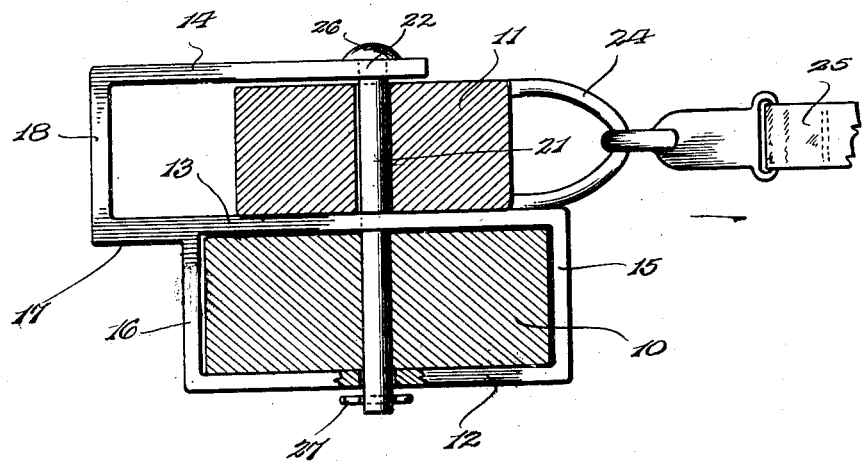
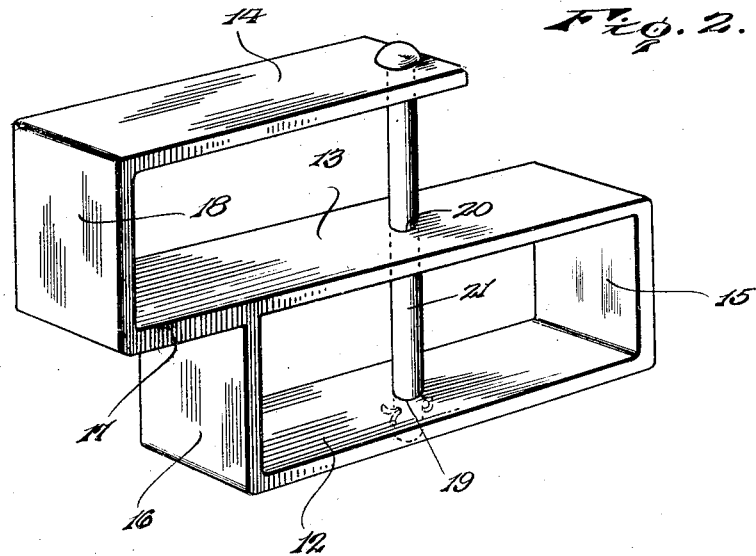
Inventor
John Anderson.
By Lacy & Lacy, Attorneys Patented Nov. 25, 1924.

1,516,876

UNITED STATES PATENT OFFICE.

JOHN ANDERSON, OF LINDSBORG, KANSAS.

CLEVIS FOR SINGLETREES.

Application filed January 8, 1923. Serial No. 611,451.

*To all whom it may concern:*

Be it known that I, JOHN ANDERSON, a citizen of the United States, residing at Lindsborg, in the county of McPherson and State of Kansas, have invented certain new and useful Improvements in Clevises for Singletrees, of which the following is a specification.

The present invention relates to a clevis for wagons and other horse drawn vehicles and implements, which is so constructed that a single bolt attaches the clevis to the end of the doubletree, while it at the same time carries a singletree, the clevis permitting the necessary swinging movement in the horizontal plane in such a manner that the traces are held without sagging. They will thus be prevented from getting entangled with the horse's legs when the traces become slackened. The clevis may be used for three or four horse teams.

By a peculiar arrangement of the clevis, the trees will not strike the horse's heels when standing still, as the trees are only able to swing in a horizontal plane without tilting down in a vertical plane.

The single bolt securing the clevis and the trees together may, in its simplest form, be made as a straight rod and provided with a head at its upper end, while its lower end extends beyond the bottom of the clevis and is prevented from jumping out by a cotter pin. It is evident that instead of this cotter pin a nut may be provided, threaded on the lower end of the bolt or in some cases it may be preferable to thread the bolt into the bottom leaf of the clevis and possibly use a lock nut to keep it from unscrewing.

In the accompanying drawing one embodiment of the invention is illustrated, and

Figure 1 is a side elevation with the trees in section, and

Figure 2 is a perspective view of the bolt and clevis.

In the drawing reference numeral 10 represents a double tree and 11, a singletree. The clevis consists of a bottom leaf 12, a center leaf 13, and a top leaf 14. The bottom and center leaves are connected by a front upright 15 and a rear upright 16, which, together with the leaves 12 and 13, form a complete rectangular loop of a size suitable to embrace the doubletree 10, as seen in Figure 1.

The central leaf 13 is extended rearwardly, as at 17, beyond the rear upright 16 where it is turned upwardly to form a rear wall 18 connecting it with the top leaf 14. In this manner a forwardly open jaw or staple is formed permitting an easy turning in the horizontal plane of the singletree 11. About midway between the front and rear uprights 15 and 16 are provided apertures 19 and 20 adapted to receive the straight bolt 21 for carrying the doubletree 10. The length of the top leaf 14 is made sufficient to permit the provision of a corresponding aperture 22 therein situated in axial alinement with the apertures 19 and 20, as seen in the drawing. It will now be clear that the bolt 21, when pushed down from the top through these apertures is able to engage both the singletree 11 and the doubletree 10, providing a pivot for the former. A considerable swinging movement is allowed for the singletree 11 by the space behind the same and the rear wall 18, as seen in Figure 1, but as the singletree 11 rests on the flat topped surface of the leaf 13, and as the end of the doubletree 10 is gripped tightly between the leaves 12 and 13 and always along the full width of the latter no sagging sideways can take place of the singletree and the latter will consequently only turn around the bolt 21 in the horizontal plane and without unduly straining the same by bending action.

Extending forwardly from each end of the singletree is seen the usual eye 24 for receiving the end of the trace 25.

The bolt 21 is provided with a head 26 and is made straight, as seen in the drawing, with no other securing means than the cotter pin 27 at the bottom. It is evident that in some cases it might be preferable to thread the lower end of the bolt 21 in the bottom leaf 12 of the clevis and provide a lock nut to keep it from unscrewing, or use a nut only without threading the leaf 12, in which case the nut will be situated below the latter. When the bolt 21 is provided with threads as thus described the head 26 would preferable be square or hexagonal.

In manufacturing the clevis, band iron is preferably used, which after being cut off to suitable length may be bent in the shape of the letter Z, and its lower shank bent upwardly to form the rear upright 16 to be welded or securely connected to the rearward extension 17 of the center leaf 13. In this manner the clevis will have uniform width and can be manufactured at a very small cost, but will still have sufficient strength for the work for which it is intended. The clevis may also be made from metal cast in a proper mold.

Having thus described the invention what is claimed as new is:

1. A clevis comprising a top leaf, a central leaf, and a bottom leaf, front and rear members connecting said bottom and central leaves to form a rectangular loop and a rear wall connecting said top and central leaves to form a forwardly open jaw between them, said rear wall being displaced rearwardly with regard to the rear member of said loop, apertures being provided in said leaves in alinement with each other, a bolt adapted to engage in all of said apertures thereby attaching the clevis rigidly on a doubletree and pivotally engaging a singletree, and means for securing the bolt in the clevis.

2. A clevis comprising a top leaf, a central leaf, and a bottom leaf, said leaves being arranged in parallel, spaced relation, front and rear members connecting said bottom and central leaves to form a rectangular loop and a rear wall connecting said top and central leaves to form a rectangular forwardly open jaw between them, said rear wall being displaced rearwardly with regard to the rear member of said loop, apertures being provided in said leaves in alinement with each other, a bolt adapted to engage in all of said apertures thereby attaching the clevis rigidly on a doubletree and pivotally engaging a singletree, and means for securing the bolt in the clevis.

In testimony whereof I affix my signature.

JOHN ANDERSON. [L. S.]